United States Patent Office 3,334,474
Patented Aug. 8, 1967

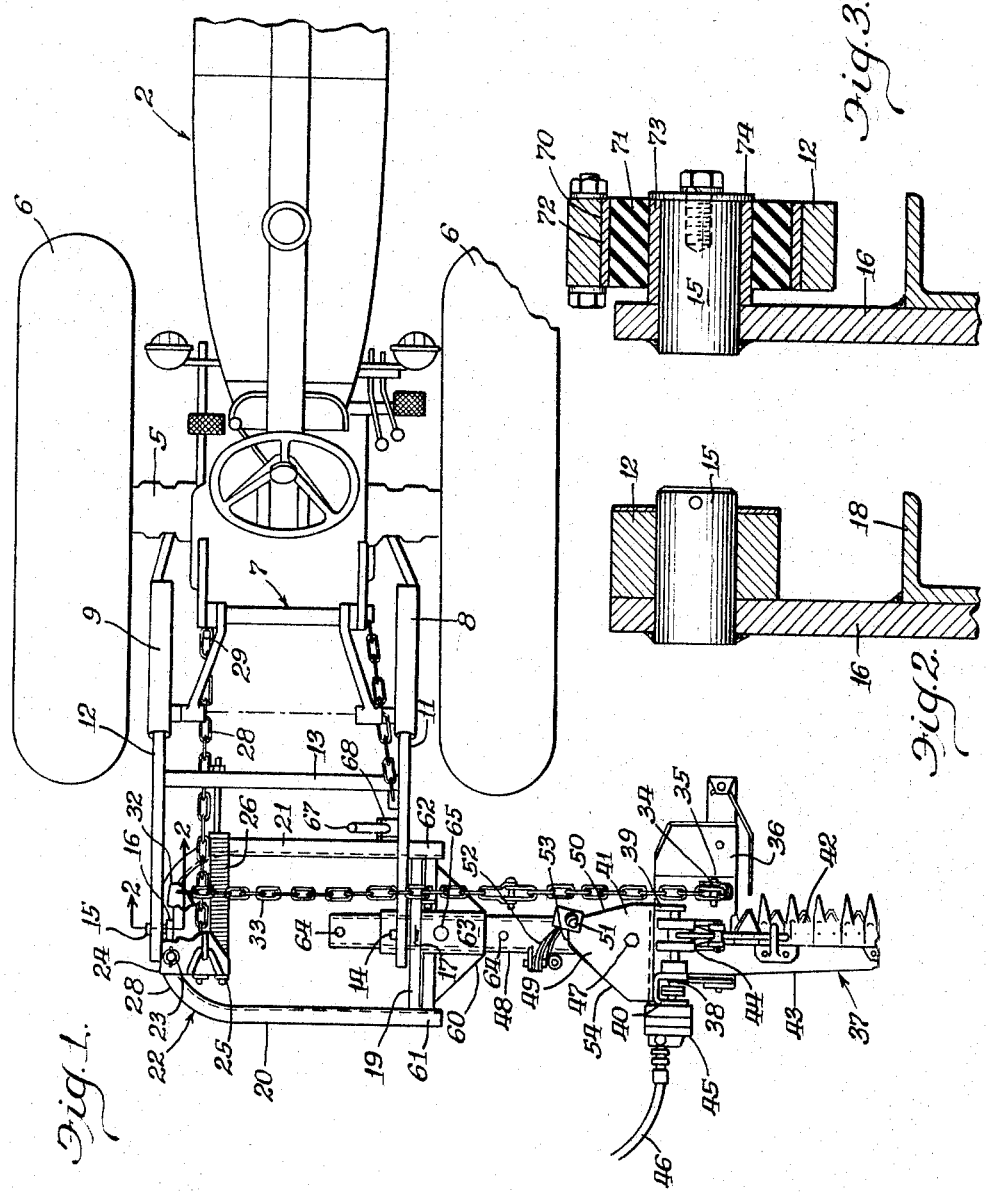

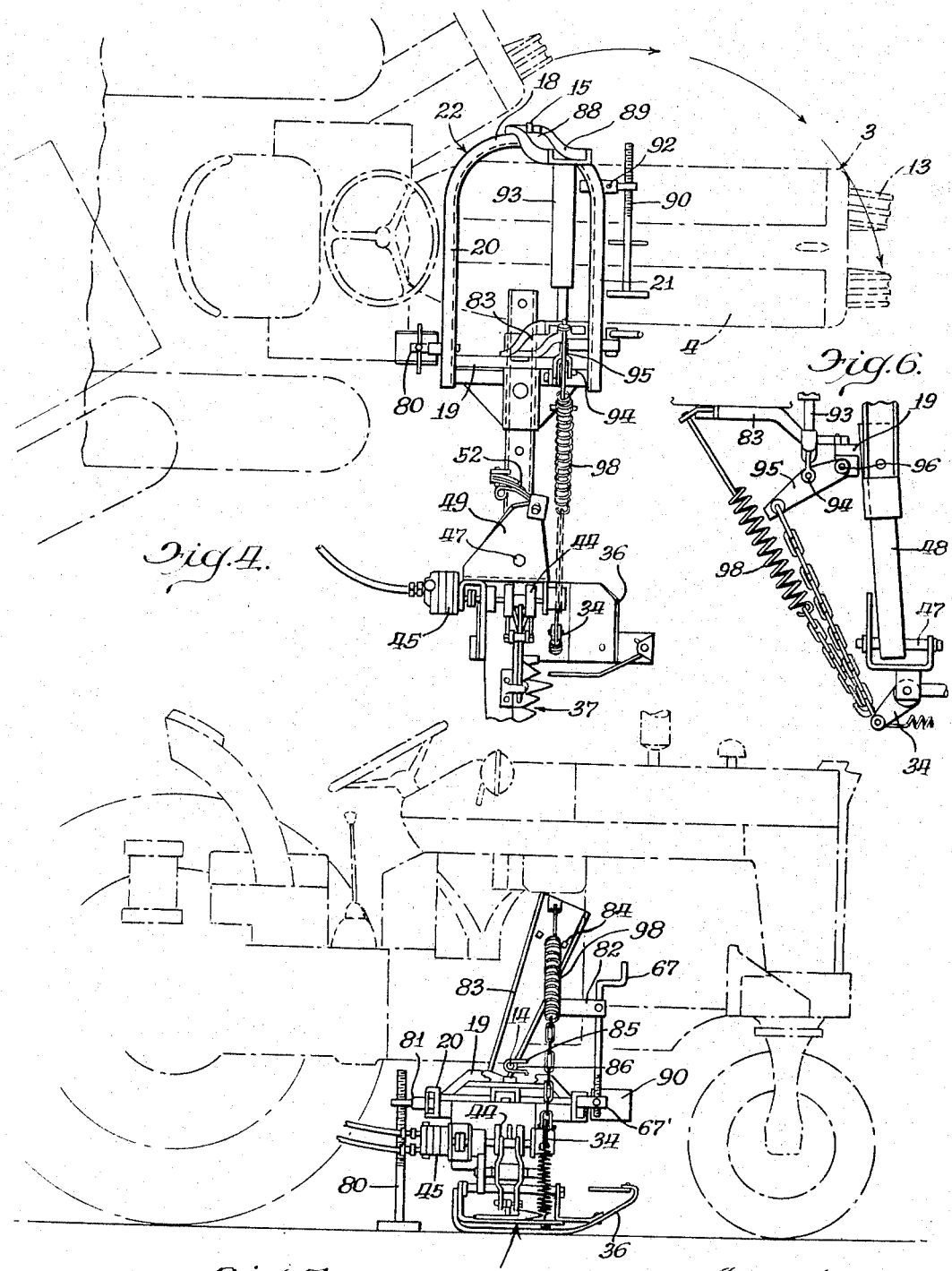

3,334,474
MOWER MOUNTING
Raymond C. Fischer, Hinsdale, Ill., assignor to International Harvester Company, a corporation of Delaware
Continuation of application Ser. No. 214,689, Aug. 3, 1962. This application Sept. 14, 1964, Ser. No. 398,149
3 Claims. (Cl. 56—25)

ABSTRACT OF THE DISCLOSURE

An elongated frame having end portions, pivot structure connected to the end portions, pendular links pivoted to the structure, attachments for the links to a tractor at a position behind the tractor or beneath the tractor, a socket structure on one end portion, and a mower mounting coupling arm in the socket and positionable various distances from the frame to accommodate mounting of the mower in the two locations while the pivots accommodate positioning of the mower frame to the tractor.

This invention relates to mowers and more specifically to a novel mounting for a mower from a prime mover or ambulatory support such as a tractor. This application is a continuation of my application Ser. No. 214,689 filed Aug. 3, 1962, and now abandoned.

It is common to provide either a side mounted or a rear mounted mower from a tractor. However, no attempt has heretofore been made to provide a common support for the tractor which will optionally attach to the rear of the tractor or midship under the waist of the tractor.

It is a general object of the invention to provide a novel mower mounting which will readily attach to the tractor either under its waist or to the rear of the tractor.

A further object of the invention is to provide a novel mower mounting in which the framework is quick-attaching.

A further object of the invention is to provide a novel mower mounting in which there is incorporated means for isolating the vibrations or dampening these vibrations from the mower.

These and other objects and advantages inherent in and encompassed by the invention will become more readily apparent from the specification and the drawings wherein:

FIG. 1 is a fragmentary plan view of a tractor and mower combination illustrating the mower in rear attachment to the tractor;

FIG. 2 is an enlarged sectional view of one of the mountings taken substantially on the line 2—2 of FIG. 1;

FIG. 3 is a view similar to FIG. 2 illustrating a modified vibration isolating mounting for the mower;

FIGS. 4 and 5 illustrate the mounting of the mower mounting structure to the tractor beneath its waist, FIG. 4 being a plan view and FIG. 5 a side elevational view; and FIG. 6 is a fragmentary front view of a portion of the operating mechanism.

Describing the invention in detail and having particular reference to the drawings, there is shown a tractor generally designated 2 of conventional type having a front steering truck 3, a longitudinal body 4, a rear axle housing 5 and traction wheels 6. The tractor carries a hitch structure generally indicated 7 which is hydraulically actuated to raise and lower the socket members 8 and 9 which admit the forward ends of the prongs 11 and 12. The prongs 11 and 12 are interconnected by a brace member 13 intermediate their ends and at the rear ends pivotally support as by pins 14 and 15 the upper ends of pendular means in the form of swing links or hangers 16 and 17, the lower ends of which are integrally connected to the bight or end portion 18 and end portion or crossmember 19 respectively, of a substantially rectangular elongated frame generally designated 22 which has front and rear legs 21 and 20, to bight 18 at one end and being interconnected by means of the aforementioned cross or brace member 19 adjacent to their free ends.

The frame 22 in normal position is disposed substantially horizontally with the members 21 and 20 being located at the rear and forward sides of the frame respectively and the bight portion 18 being located at the stubbleward end of the frame. The bight portion 18 mounts an upstanding pivot pin 23 about which is pivoted a bellcrank lever 24. One leg 25 of the bellcrank is connected to the rear end of an auxiliary balancing spring 26 which at its forward end is connected to the crossmember 13. The leg 25 is also connected to an operating chain or linkage 28 which at its forward end 29 is suitably connected to the tractor, and as will be readily understood by those skilled in the art, since the hitch structure 7 rotates about a different center than the point of connection of the chain 28 there is relative movement between these points and therefore as the frame together with the hitch is elevated the chain 28 in effect shortens and therefore rotates the bellcrank in a counterclockwise direction as seen in FIG. 1 whereupon the end 32 of the bellcrank which is connected to the lifting chain or linkage 33 moves in a counterclockwise direction pulling on the chain 33 which extends to an upstanding anchor 34 to which it is pivoted by pin 35, the anchor 34 being connected to the inner shoe 36 of the mower generally designated 37.

The mower 37 pivots about the shaft 38 which is suitably journaled in the supports or lugs 39 and 40 which are connected to the jaw member 41. In the present instance the sickle 42 is reciprocated on the stationary cutter bar 43 by means of the crank assembly or drive means 44 which in the present instance is formed as part of shaft 38.

The shaft 38 is connected to an hydraulic motor 45 which is driven through the hydraulic lines 46 in conventional manner. It will be observed that the jaw member 41 is pivoted on a substantially vertical axis by means of a pin 47 which mounts on the outer end of a telescoping arm or coupling element 48. The upper plate 49 of the jaw member 41 is suitably contoured providing a front stop edge 50 which cooperates with the detent 51 on the outer end of a spring assembly 52 carried from the arm 48, the detent 51 serving to hold the mower in operating position under normal circumstances and being effective to spring back beyond the cam edge 53 on the inner end of the plate 49 as the mower is swung back in a breakaway position about the axis of the pin 47 upon the mower striking an obstruction. It will be appreciated that the back edge 54 of the cam plate 41 provides a diagonal outwardly and rearwardly extending edge which temporarily maintains the mower in a breakback position and accommodates the detent 51 to ride thereon and over the cam edge 53 and back in front of the edge 50 upon the mower 37 being swung back to its normal operating position.

In the present embodiment of the invention it will be observed that the coupling arm 48 telescopes within a gusset bracket 60 which is mounted between and connected to the outer ends 61 and 62 of the legs 20 and 21. It will be observed that the gusset bracket 60 is provided with a socket portion 63 which extends transversely of the tractor and admits the coupling arm 48 therethrough, the arm 48 being provided with a series of vertical openings 64 which admit a vertical pin 65 therethrough in any of the openings 64 selected in order to establish the position of the mower laterally with respect to the tractor.

It will be also observed that in the present embodiment of the invention since the mower is mounted on swing links which have axes of pivot transversely of the tractor that the same may be readily adjusted for the purpose of controlling the tilt simply by cranking the crank 67 which at its lower end is connected to a portion of the leg 21 and intermediate its ends is suitably mounted in a bracket 68 which is connected to the prong 11.

It will be seen that in the modification of FIG. 3 showing the mounting of each link 16 or 17 that there is interposed between the associated arm 12 within a bore 70 therein a resilient bushing of elastomer material or bearing 71 which has an outer metallic sleeve 72 about its outer periphery snugly received within the opening 70, the member 71 having an inner metallic sleeve 73 which sleeves over the associated pin 15 and is retained thereon between the arm 16 and the opposing nut secured washer 74. In this embodiment it will be appreciated that vibrations generated by the mower longitudinally thereof are absorbed and yieldably controlled by bushings 71. The bushings flex radially and yieldably cushion vibrations of the mower in radial planes to isolate mower vibrations when the mower is operated in transport position when temporarily raising the bar to avoid stumps or other obstructions.

Referring now to the embodiment of the invention in FIGS. 4 and 5 wherein parts identical with those of the previous embodiments are identified with corresponding reference numerals, it will be observed that the mower frame 22 is admitted under the waist of the tractor by driving the tractor as shown in phantom lines in FIG. 4 angularly past the mover frame 22 which in the present instance is supported by means of a jack or screw 80 which is suitably connected or threaded adjacent to its upper end to a lug 81 which is connected to the rear leg 20 of the mower frame 22 and projects rearwardly therefrom. It will be seen that in the present embodiment the lower end of the tilt adjusting crank 67 is threadedly connected through a trunnion to the lug 67' which is connected to the forward leg 21 of the frame as in the previous embodiment, while the upper part of the crank has a rotatable connection with an arm 82 which is connected to a pendular mounting bracket 83 suitably connected as by bolts 84 to the side of the tractor body 4. In the present embodiment the member 19 is provided with the pin 14 which is admitted into a forwardly open U-shaped jaw 85 and locked therein by a pin 86, the jaw 85 being integral with or formed at the lower end of the mounting arm 83. It will be seen that the pin 15 is similarly received within a jaw 88 which is formed in the lower end of a pendular mounting bracket 89 which is secured to the side of the body 4 of the tractor opposite that to which the arm or bracket 83 is secured. It will be noted that the arms 89 and 83 extend below the bottom of the waist of the tractor. In the present embodiment there is provided a forward jack 90 which is suitably secured to a bracket 92 on the forward leg 21 of the frame 22 and the jack 90 together with the jack 80 serve as temporary supports for the frame. In the present embodiment the actuation of the lifting mechanism for the mower is accomplished by a cylinder 93 which at one end is anchored to the bight portion 18 of the frame 22 and at its other end is connected as at 94 to an upstanding lever 95 (FIG. 6) which is pivoted at its lower end at 96 to member 19 and at its upper end to chain 97 which connects to arm 34 on the inner shoe 36. A counterbalance spring 98 extends between arm 34 and bracket 83.

It will be understood that a novel drive-in and drive-out mounting has been obtained for the mower as will be readily apparent from the diagrammatic phantom illustrations of FIG. 4.

Having described several embodiments of the invention, it will be understood that other forms of the invention become readily apparent to those skilled in the art within the scope of the appended claims.

What is claimed is:

1. A mounting assembly for optionally connecting a reciprocating mower behind or beneath a tractor comprising an elongated frame having front and rear portions and interconnecting transversely spaced end portions, pendular means connected to said end portions and having means for attachment to associated supporting structure on the tractor for pivotal movement of the frame about an axis extending longitudinally of the mower, socket means connected to one of said end portions, a mower coupling arm extending through the socket means and movable axially thereof, means releasably connecting said arm to the socket means, said arm positionable at various distances laterally in extension of the frame, and a mower assembly connected to said arm.

2. The invention according to claim 1 and said pendular means having free end portions including vibration isolating resilient bearing means adapted to be disposed on said supporting structure.

3. The invention according to claim 1 and tilt adjusting means operatively connected between the frame and the supporting structure for tilting the frame about said axis extending longitudinally of the mower.

References Cited
UNITED STATES PATENTS

| | | | |
|---|---|---|---|
| 2,446,883 | 8/1948 | Pool et al. | 130—27 |
| 2,603,930 | 7/1952 | Holmes | 56—25 |
| 2,628,467 | 2/1953 | Gillespie | 56—25 |
| 2,686,658 | 8/1954 | Hill et al. | 56—25 X |
| 2,686,998 | 8/1954 | Miller et al. | 56—25 |
| 2,700,263 | 1/1955 | Goss | 56—25 |
| 2,719,394 | 10/1955 | Thomann et al. | 56—14 |
| 2,869,306 | 1/1959 | Hagen | 56—14 |
| 3,082,588 | 3/1963 | Jay et al. | 56—1 |
| 3,090,183 | 3/1963 | Thomson | 56—1 |

ABRAHAM G. STONE, *Primary Examiner.*

RUSSELL R. KINSEY, *Examiner.*

M. C. PAYDEN, *Assistant Examiner.*